A. GUTHRIE.
Ice Machine.
No. 99,881.  Patented Feb. 15, 1870.
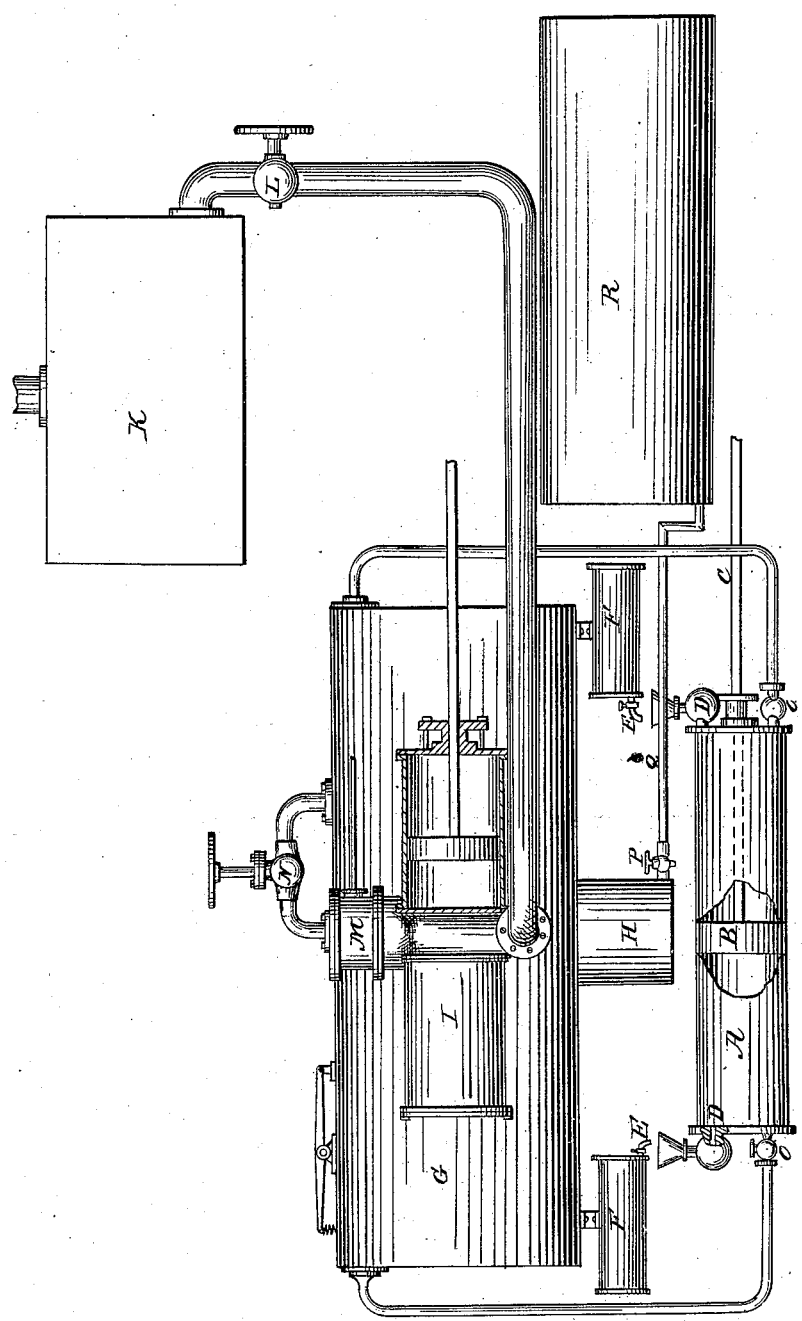

UNITED STATES PATENT OFFICE.

ALFRED GUTHRIE, OF CHICAGO, ILLINOIS, ASSIGNOR TO HIMSELF AND A. E. GOODRICH.

IMPROVEMENT IN APPARATUS FOR REFRIGERATING.

Specification forming part of Letters Patent No. 99,881, dated February 15, 1870.

*To all whom it may concern:*

Be it known that I, ALFRED GUTHRIE, of Chicago, in the county of Cook and State of Illinois, have invented certain novel and improved means whereby to produce with great facility changeable and various degrees of temperatures below that of the surrounding atmosphere, of which the following is a specification:

The nature of my said invention consists in the construction, combination, and arrangement of devices, hereinafter described, whereby to compress and expand atmospheric air, and obtain the requisite temperature for facilitating the packing of warm fresh-slaughtered meats, transportation of perishable articles, preservation of ripe fruits in their natural condition, for preventing improper fermentation of liquids, and for cooling and rendering pleasant and healthy halls of legislation, lecture-rooms, churches, places of amusement, steamships, and other vessels exposed to oppressive temperatures or unhealthy localities.

In the accompanying drawings, A represents the air-pump; B, its piston; C, the piston-rod; D D, the pump-valves; E E, the water-drip valves; F F, the water-reservoirs, for supplying water through the drip-valve chambers to the air-pump.

G is the compressed-air reservoir, which is supplied with air to that extent of pressure necessary for any specific object.

H is the water-well, which receives the air-pump-lubricating water, whence it may be allowed to escape into the steam-generator.

I is the auxiliary air-engine, which is to be actuated by the atmospheric pressure in the air-reservoir G, and at the terminus of each stroke of the piston the air is allowed to exhaust into the low-temperature chamber, where the hereinbefore-stated useful and sanitary effects and functions are to be utilized and manifested.

J is the compressed-air-exhaust pipe, extending from the air-engine to the chamber.

K is the compressed-air-receiving chamber, into which the air is exhausted, and in which the temperature is graduated, as desired, in due proportion to the degree of atmospheric pressure in the reservoir, its escape into the chamber, and extent of expansion of the before-compressed air.

L is the globe-valve for regulating the egress from the auxiliary engine, and consequently the atmospheric expansion in the cooling or receiving chamber.

M is the valve-chest, in which the usual valve for the ingress and egress of steam is, in a similar way, operated for the ingress and egress of air to and from the air-engine cylinder.

N is the valve, with its appropriate spindle and wheel for regulating the quantity of air to be admitted to the air-engine.

I have not described the kind of power fundamental to actuate the air-pump. This may be the steam-engine, hydraulic, pneumatic, animal, or soul power; and the means of communication or transmission are too well known to mechanics to require description. Nor have I shown the enginery for immediate connection with the air-pump and with the air-engine, believing such description unnecessary, as such mechanisms are common and well known to those skilled in the mechanic arts to which this my said invention appertains.

O O are the check-valves, which serve to prevent the air returning after having been forced through their openings into the air-receiver G. The induction drip-valves, through the openings of which the air enters in its normal pressure into the air-pump, serve a threefold purpose. As the air and water enter simultaneously into the air-pump, the water serves to lubricate the valves and piston, to absorb the heat due to the compression of the air and its friction, and as a packing in any interstices and clearance between the piston and cylinder-heads of the air-pump, so that the air shall be all discharged from the air-pump into the receiver or reservoir G.

P is the stop-cock, and Q the pipe leading water from the well H to the steam-generator R.

It is evident that when the air-reservoir G is charged with a surplus pressure, the auxiliary air-engine may with economy be actuated by such surplus pressure, and thus rendered available in working the air-pump, and for other purposes, in addition to its usual function.

Having described the nature and object of my said invention, what I claim as new, and desire to secure by Letters Patent, is—

1. The combination of the water-reservoirs F F, pump-valves D D, and air-pump A, substantially as herein set forth.

2. The combination of the compressed-air chamber G, water-well H, and steam-generator R, substantially as herein made known.

3. The combination and arrangement of the water-reservoirs F F, valves D D, air-pump A, air-compressing reservoir G, valve-chest M, air-engine I, air receiving or expanding chamber K, water-well H, and steam-generator R, when constructed and operating substantially as herein described, and for the purposes herein set forth.

ALFRED GUTHRIE.

Witnesses:
T. A. COOK,
EDM. F. BROWN.